Feb. 23, 1960   F. E. HUGHES   2,925,681
FISH LURE
Filed April 16, 1957
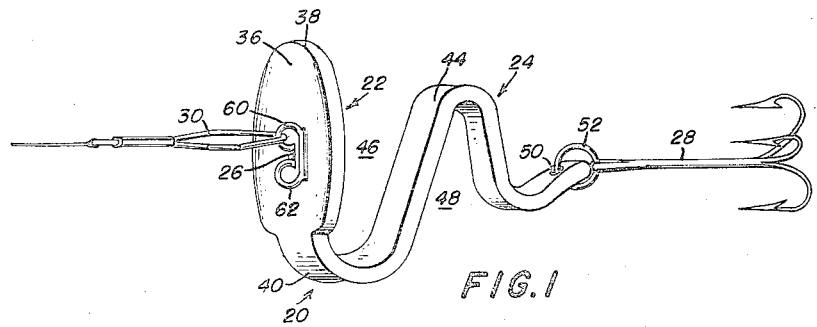
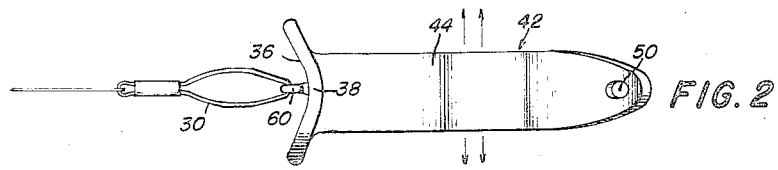
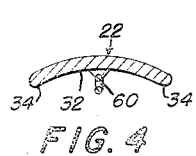
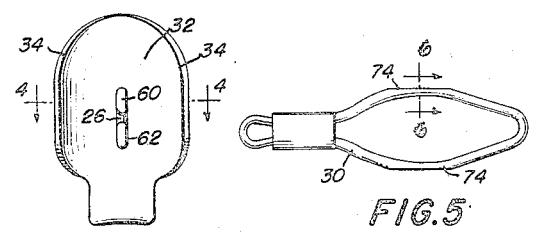
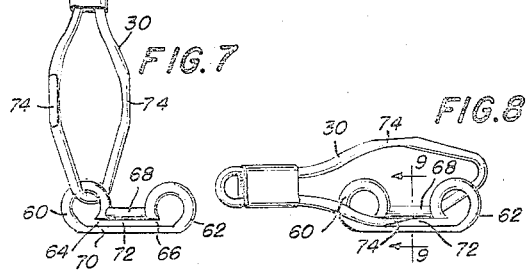
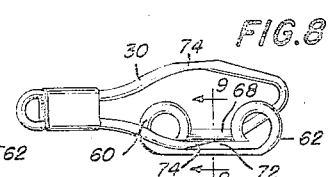
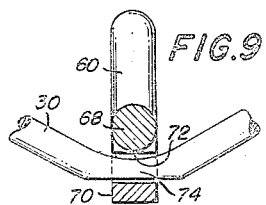
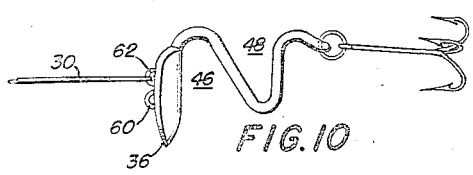
INVENTOR
FREDERICK E. HUGHES
BY Leech & Radue
ATTORNEYS United States Patent Office 2,925,681
Patented Feb. 23, 1960

2,925,681
FISH LURE
Frederick E. Hughes, Arlington, Va.
Application April 16, 1957, Serial No. 653,220
5 Claims. (Cl. 43—42.5)

This invention relates to a novel fish lure and more particularly to a rigidly formed lure of unitary construction, having a wiggling action when drawn through the water.

There has long been a need for a multi-purpose lure which would make it unnecessary for the fisherman to be continually changing from one lure to another when he desires to fish shallow or deep, or wishes to vary the amount of action of the lure when drawn through the water. Additionally, such a multi-purpose lure should possess a simple and efficient method of selectivity without the necessity of removing and refastening the line attachment which is normally required when changing from one lure to another. For even greater multi-purpose utility it would be desirable for such a lure to display two selectively different physical appearances in the water which would be possible if the lure could be utilized in either an upright or inverted position. This characteristic would be further enhanced if the top and bottom surfaces of the lure were differently marked or colored.

An object of this invention is to provide an S-shaped lure having a head portion and a rearwardly extending body portion so formed that the lure will wiggle laterally as it is drawn through the water.

It is also an object of this invention to provide an S-shaped lure having a head and rearwardly extending body wherein a multi-position line attaching means is mounted on the forward face of the head so that various types of actions may be achieved.

It is another object to provide an S-shaped lure having an enlarged transversely curved head carrying a multi-position line attaching member wherein the change of position of the line causes the lure to become inverted.

It is yet another object to provide a lure as described above wherein there is a lateral wiggling action produced when the lure is drawn through the water, and yet there is no tendency for the lure to roll about its longitudinal axis regardless of its speed through the water.

Still another object is to provide means which will make it possible to quickly and easily transfer the fishing line from one position to another on a lure.

The device of this invention comprises a rigidly formed S-shaped lure having a head with a transversely concave front face and a body extending rearwardly therefrom. It is contemplated that the item will be of unitary construction and preferably of metal or a suitable plastic. The lure is designed so that its shape will resemble a worm, eel, or snake, and this greatly enhanced by the lateral wiggling action achieved when the lure is drawn through the water. It is a multi-purpose lure in that it has an attachment on the face of the head which is adapted to secure the line at two different vertical positions on the face wherein the change of position of the line causes the lure to become inverted and thus provides a different degree of lure action.

This invention will appear more clearly from the following detailed description when taken in conjunction with the accompanying drawing, showing by way of example, a preferred embodiment of this invention and wherein:

Fig. 1 is a three-quarter perspective view of the fish lure showing the line secured to the upper position of the line attaching member on the head of the lure, Fig. 2 is a top plan view of the lure, Fig. 3 is a front elevational view of the lure, Fig. 4 is a horizontal cross-sectional view taken along line 4—4 of Fig. 3, Fig. 5 is an enlarged plan view of the closed loop used to secure the line to the multi-position attaching member on the lure head, Fig. 6 is a vertical cross-sectional view taken along line 6—6 of Fig. 5, Fig. 7 is an enlarged plan view showing the closed loop in one of the eyelets of the multi-position attaching member, Fig. 8 is an enlarged plan view showing the loop as it is shifted from one eyelet to the other, Fig. 9 is a vertical cross-sectional view taken along line 9—9 of Fig. 8; and Fig. 10 is a side elevational view showing the lure with the loop in the lower eyelet after the lure has inverted itself so that the head points downwardly.

As shown in Fig. 1 the S-shaped fishing lure 20 of this invention comprises a head 22, a body 24 and a line attaching member 26 on the head. The lure is equipped with a conventional treble hook 28 secured to the rearward end of the body while the fishing line is secured to a loop 30, which is looped through the attaching member 26.

The head 22 comprises one end portion of the S-shaped lure and has a concave front face 32 forming forwardly extending side flange portions 34 as indicated by the cross-sectional view shown in Fig. 4. The top portion 36 of the front face slopes gently rearwardly producing a thinner upper edge portion 38, as illustrated in Fig. 2. Referring to Figs. 1 and 3, the lower portion 40 of the head curves slowly rearward and merges into rearwardly extending body 24.

The body 24 extends rearwardly from the lower portion of the head in a direction generally perpendicular thereto. As indicated by Figs. 1 and 2, the body comprises a curved strip portion 42, which along with the head forms the S-shaped lure configuration. The widthwise surface 44 of the body extends transversely with respect to the plane of the S formed by the lure. It should be noted that the width of strip 42 is less than the maximum transverse width of the head. The body need not necessarily be strip-like. It may be round, oval or have some other cross section, in any event the maximum transverse diameter or width will be less than that of the head. The undulations 46, 48 formed by successive portions of the head and body have a depth less than the length of the head and the spacing between successive undulations is such that the length of the body is greater than the length of the head. The rearward end of the body has an aperture 50 which receives a ring 52 to which the treble hook 28 is secured.

The line attaching means as shown in Fig. 1 is a multi-position device and is shown in detail in Figs. 5 to 9. This assembly comprises a loop 30 and an attaching member 26. The attaching member comprises a pair of eyelets 60, 62 mounted in spaced relation and having openings 64, 66 respectively which confront each other. Connecting member 68, 70 connect the corresponding ends of each eyelet to form a guiding means in the form of a channel 72 to guide the loop 30 when it is shifted from one eyelet to the other.

The side portions 74 of loop 30 are of reduced cross-section as indicated in Fig. 6. Thus it is possible to pass the loop through channel 72 even though this channel is too narrow for the diameter of the main portion of the loop. This arrangement is quite advantageous and will be discussed with particularity later.

As shown in Fig. 1 the attaching member 26 is secured to the front face of the head 22 in a vertical manner so that the eyelets 60, 62 are vertically spaced from one another. With the loop 30 in the upper eyelet 60 the lure will ride through the water in an upright position as illustrated in Fig. 1. To facilitate an explanation of the relationship of eyelets 60 and 62 to the front face of the head, the term "center of balance connecting point" is defined as that connecting point near the center of the front face from which the lure may be drawn through the water in a stable manner with a desired wiggling action. Such an exact connecting point is not desirable for the positioning of either eyelet 60 or 62 however, since this balance point does not provide the lure with a natural tendency to assume a definite riding position in the water. Therefore it has been discovered that by positioning an eyelet 60 slightly above the "center of balance connecting point," the lure will naturally tend to assume a stable upright position and still retain a desired wiggling action.

With the loop in the upper eyelet position the front face will tilt so that the upper portion thereof will slant forwardly in the direction of travel and we have a lure which is characterized as a shallow depth lateral wiggler. The wiggling action is produced by the concave face which is more or less conventional in and of itself.

When it is desired to transfer the loop from the upper position as shown in Fig. 1 to the lower position shown in Fig. 10 it is merely necessary to swing the loop as illustrated in Fig. 8 so that one of the portions 74 of reduced cross section is in alignment with the channel 72 and pass it through this channel as indicated in Fig. 9.

With the loop in eyelet 62 the lure will invert itself as in Fig. 10 when pulled through the water. This is apparently caused by the fact that the eyelet 62 is sufficiently below the "center of balance connecting point" so that the unbalance in pressure produced on the face of the head when the lure is pulled through the water causes the lure to invert and remain inverted. In this instance we have what may be characterized as a deep running lateral wiggler due to the fact that the portion of the face nearest loop 60 slants forwardly and downwardly. With loop 30 in eyelet 62 a more rapid wiggling action is developed than when the loop is in eyelet 60. This is believed to be caused by the fact that the eyelet 62 is nearer than eyelet 60 to the longitudinal axis of the lure.

Thus there has been produced a combination lure which in the upright position is a shallow running lateral wiggler and when in the inverted position is a deep running laterial wiggler. It should be noted that when the eyelets are properly positioned on the front face of the lure, there is no tendency for the lure to roll once it has assumed its proper position in the water. Apparently the S-shaped body aids in preventing the rolling of the lure when it is drawn through the water due to the fact that the body mass is distributed proportionately about the longitudinal axis of the lure.

There is an advantage derived from forming the reduced portions 74 of the loop in the sides thereof and maintaining the remainder at such a size that it will not pass through the channel connecting the eyelets. In normal use the loop will engage the eyelet as indicated in Fig. 1, and since this portion of the loop has a diameter greater than the channel 72 then it cannot accidently slip therethrough. During a period of slack line, such as occurs when the lure initially strikes the water while casting, the loop may feasibly turn laterally and slide from the position indicated in Fig. 1. However, since the loop also tends to turn around its longitudinal axis to some degree on such occasions, it does not assume the position indicated in Fig. 8. Thus, it requires a positive and deliberate effort to change the position of the loop from one eyelet to the other.

Having thus described my invention, what I claim as novel and desire to secure by Letters Patent of the United States is:

1. A rigid unitary non-buoyant fish lure comprising a vertical head portion, a body portion extending directly rearward therefrom and line attaching means secured to the head portion, the height of the head portion being greater than its width, said head portion having a transversely concave front face forming forwardly directed side portions, said body emerging from one end of the head portion and undulating in side elevation with at least two bends, the angle between the head portion and the first bend being less than 90°, the height of the first undulation being at least one half the height of the head portion and each succeeding undulation being less than the height of the head portion, the body having a cross section wherein the maximum dimension is less than the width of the head portion, and said line attaching means being centrally attached to the head portion so that when the lure is pulled through the water the head portion will ride in an upstanding position and the body will oscillate horizontally.

2. A rigid unitary non-buoyant fish lure comprising a vertical head portion, a body portion extending directly rearward therefrom and line attaching means secured to the head portion, the height of the head portion being greater than its width, said body emerging from one end of the head and undulating in side elevation with at least two bends, the angle between the head portion and the first bend being less than 90°, the height of the first undulation being at least one half the height of the head portion and each succeeding undulation being less than the height of the head portion, the body portion having a cross section wherein the maximum dimension is less than the width of the head portion, and said line attaching means being centrally attached to the head portion so that when the lure is pulled through the water the head portion will ride in an upstanding position and the body will oscillate horizontally.

3. A rigid unitary non-buoyant fish lure comprising a vertical head portion, a body portion extending directly rearward therefrom and line attaching means secured to the head portion, the height of the head portion being greater than its width, said body portion comprising a flat strip-like element emerging from one end of the head and undulating in side elevation with at least two bends, the angle between the head portion and the first bend being less than 90°, the height of the first undulation being at least one half the height of the head portion and each succeeding undulation being less than the height of the head portion, the body width extending transversely to the head portion and being less than the width of the head portion, and said line attaching means being centrally attached to the head portion so that when the lure is pulled through the water the head portion will ride in an upstanding position and the body will oscillate horizontally.

4. The device as described in claim 1 wherein the line attaching means secured to the head is a multi-position line attaching unit mounted on the front face of the head so that the line may be secured at various points thereon.

5. The device as described in claim 4 wherein the multi-position line attaching unit comprises two vertically spaced line attaching members on the front face of the head, so disposed that when the line is secured in the upper position the lure will ride in an upright position as it is pulled through the water and when in the lower position the lure will invert itself upon being drawn through the water.

References Cited in the file of this patent

UNITED STATES PATENTS

| | | | |
|---|---|---|---|
| 1,037,991 | Robinson | Sept. 10, | 1912 |
| 1,419,540 | Brown | June 13, | 1922 |
| 1,548,662 | Crawford | Aug. 4, | 1925 |
| 2,088,775 | Davenport | Aug. 3, | 1937 |
| 2,119,805 | Davenport | June 7, | 1938 |
| 2,295,292 | Rogers | Sept. 8, | 1942 |
| 2,503,672 | Johnson et al. | Apr. 11, | 1950 |
| 2,506,263 | Bessinger | May 2, | 1950 |
| 2,547,103 | White | Apr. 3, | 1951 |
| 2,588,055 | Smith | Mar. 4, | 1952 |
| 2,698,494 | Larsen | Jan. 4, | 1955 |
| 2,788,604 | Sleight | Apr. 16, | 1957 |

FOREIGN PATENTS

| 897 | Great Britain | 1899 |
|---|---|---|